2 Sheets—Sheet 1.
D. H. MURPHY.
COMMODE.
No. 11,410. Reissued Mar. 27, 1894.
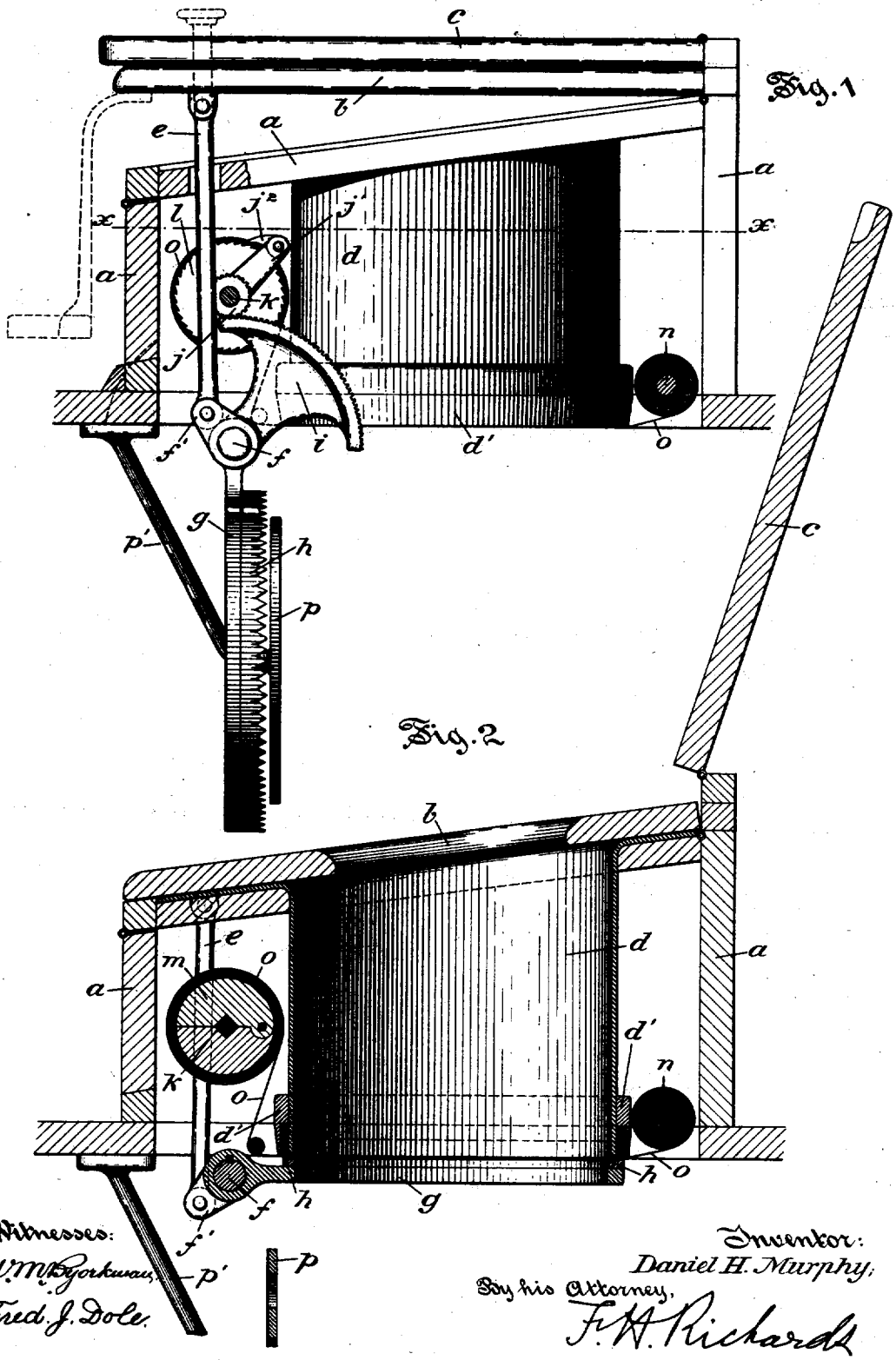
THE NATIONAL LITHOGRAPHING COMPANY,
WASHINGTON, D. C.

2 Sheets—Sheet 2.

D. H. MURPHY.

COMMODE.

No. 11,410.

Reissued Mar. 27, 1894.

Witnesses:

Wm. Bjorkman.

Fred. J. Dole.

Inventor:

Daniel H. Murphy;

by his Attorney,

F. H. Richards

THE NATIONAL LITHOGRAPHING COMPANY,
WASHINGTON, D. C.

UNITED STATES PATENT OFFICE.

DANIEL H. MURPHY, OF HARTFORD, CONNECTICUT.

COMMODE.

SPECIFICATION forming part of Reissued Letters Patent No. 11,410, dated March 27, 1894.

Original No. 454,128, dated June 16, 1891. Application for reissue filed June 5, 1893. Serial No. 476,683.

*To all whom it may concern:*

Be it known that I, DANIEL H. MURPHY, a citizen of the United States, residing at Hartford, in the county of Hartford and State of Connecticut, have invented certain new and useful Improvements in Commodes, of which the following is a specification.

This invention relates to that class of commodes or dry-closets which are more particularly intended for use on railway-cars; the object being to furnish a commode in which the discharge outlet shall be closed while the commode is in use, and in which the feces shall be collected on a receiving-sheet, or seal-sheet, and afterward disposed of *en masse* by the discharge of said sheet; also to provide simple and effective mechanism for placing, supporting and discharging the seal-sheet, and means for automatically actuating said mechanism from the operation of a reciprocatory member, such as the movable seat or the cover of the commode.

Figure 3:
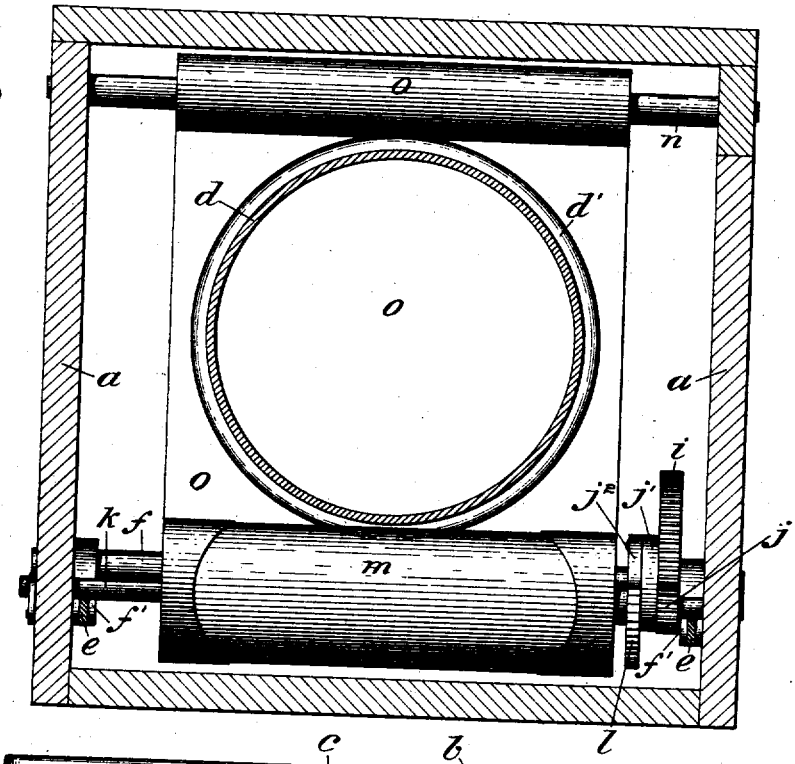
Figure 4:
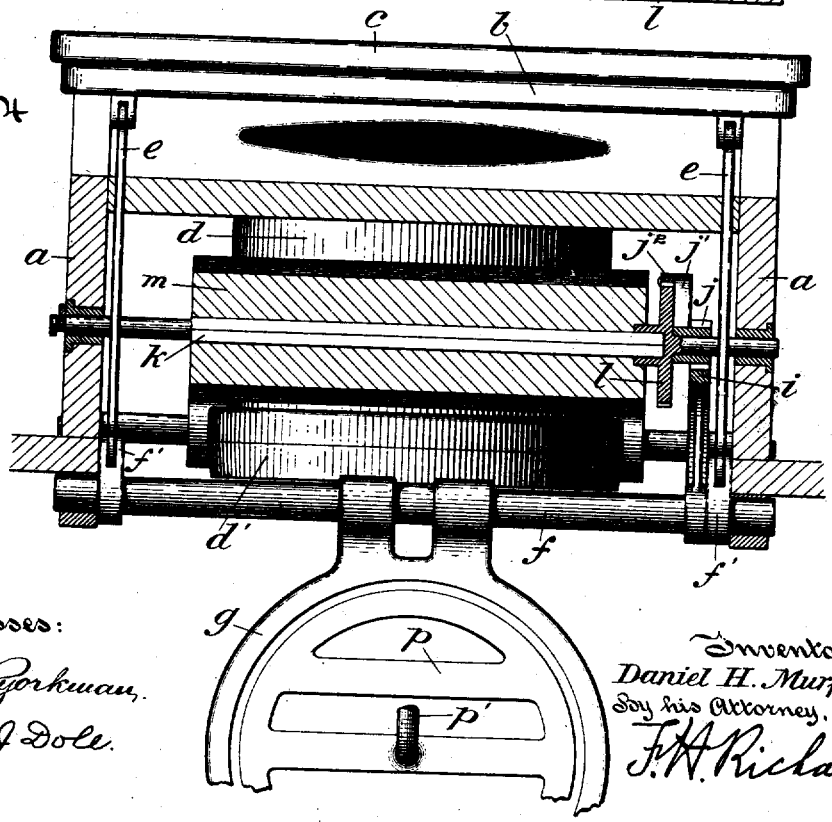

Referring to the accompanying drawings, forming a part of this specification, Figure 1 is a side elevation, partially in section of a commode and its mechanism embodying my present invention. Fig. 2 is a central vertical section of the commode and its mechanism, as seen from a point of view corresponding to that in Fig. 1. Fig. 3 is a sectional plan view on the line $x$—$x$, Fig. 1, of the parts located below said line. Fig. 4 is a sectional front elevation, as seen from the left-hand in Fig. 1.

Similar characters designate like parts in all of the figures.

The commode herein shown and described is "self sealing," it being furnished with a seal-sheet supply-apparatus, and with appliances for placing the paper, or other sealing material in sheet-form, underneath the tube of the commode, for holding said paper or sheet in place, and for afterward discharging said sheet together with any accumulations thereon. Said supply-apparatus is located adjacent to the lower end or opening of the tube or chamber of the commode, in position for feeding and presenting the seal-sheet across underneath said opening; and is provided with means for actuating the same, consisting of a rod or handle suitably connected, consisting, preferably, of actuating-mechanism connecting the apparatus with a reciprocatory member, (such as the usual vertically-movable seat or cover,) located above the chamber of the commode. Said apparatus is also furnished, when constructed and arranged as hereinafter more fully described, with a vertically movable or oscillating clamp or support for holding in place the sheet of sealing-material, and with a similarly operated knife for severing said material.

Having thus referred to the object and nature of my invention, and to the principal features and general organization thereof, I will next particularly describe a commode-mechanism made according thereto, and explain the mode of operation of this mechanism.

In the drawings, the letter $a$ designates an ordinary commode-casing, to the back edge of the top of which are hinged the reciprocatory open seat $b$ and the cover $c$. The bowl or tube $d$, which may be of any suitable description, is supported by this casing in the ordinary manner. One or more rods $e$, pivoted at their upper ends to the bottom of the seat, are pivoted at their lower ends to the cranks or rocker-arms $f'$ of a shaft $f$, that is journaled in the frame-work of the commode; on said shaft is carried a frame or clamp $g$, which is shown provided with a knife or cutting-blades, preferably arranged in a circle, so as to form an annular knife $h$, and have a serrated or notched edge. Said shaft $f$ also has a segmental gear $i$, which meshes with a pinion $j$, loosely mounted on a shank $k$, that is also journaled in the framework of the commode. Secured to this pinion is an arm $j'$, bearing a pawl $j^2$, which engages a ratchet-wheel $l$, that rotates with the shaft $k$. Upon a squared portion of this shaft, is placed a roll $m$, preferably formed in two parts hinged together in order that the roll may be loosened from the shaft for removal; also, that it may be made to clasp and hold one end of the sheet $o$ of sealing-material, a long strip or sheet of which, somewhat wider than the diameter of the commode-tube, is wound upon a roll $n$, that is removably supported in suitable bearings in the casing, upon the opposite side of the tube from the roll $m$.

A discharge-plate or frame, $p$, is shown supported and held a little in advance of the plane of the knife, when this is open, by a rod or standard $p'$, that passes through the opening in the knife-frame or clamp $g$, so that any material which might cling to the knife or clamp is thrust off when these drop to their normal open position, as shown in Fig. 1.

A roll $n$, containing the sealing-material $o$, which may be paper, or of other similar cheap readily severable material, is placed in its bearings in the casing and the end of the paper led across the tube either at the bottom or through an opening in its walls and secured to the roll $m$. When the seat is depressed, (this being connected as described,) as by the weight of a person, the shaft $f$ is rotated and the clamp $g$ swings upward to support the seal-sheet, and to bring the knife or blades into the socket shown in Fig. 2 between the flange $d'$ and the bottom of the tube $d$; this operation severs a piece from the center of the sealing material over the bottom of the tube, said piece being in the present instance, circular in form. At the same time the segmental gear is oscillated and the pinion rotated, thereby retracting the pawl over the teeth of the ratchet-wheel, which remains stationary. When the pressure is removed from the seat, the weight of the frame $g$ causes the knives to swing downward, allowing the severed portion of the seal-sheet, (upon which the feces have been deposited,) to drop from the tube. As the gear $i$ is oscillated back and drives forward the pinion, the pawl catches the ratchet and feeds the roll, winding the edges of the cut portion upon the roll $m$ and quickly drawing a new portion of the seal-sheet across underneath the commode-tube. By this means, the commode chamber is sealed each time the commode is used, with a fresh clean piece of material having itself no noxious odor; and is automatically covered or sealed after using, for preventing the entrance of dust or dirt, or the passage through the tube into the apartment of drafts of cold-air or noxious vapors.

If it is desired, the oscillation of the shaft $f$ may be accomplished by means of a step connected with the seat as indicated by dotted lines at the left-hand in Fig. 1, or to the rocker-arm on the shaft, or by means of a bolt or rod that may be depressed by hand, as shown by the dotted continuation of the rod $e$, in Fig. 1.

It is to be understood that I do not limit myself to the precise construction herein shown for accomplishing the object of the invention, as other forms and arrangement of apparatus for supplying the sealing-material, and for feeding and severing the same may be made within the scope and limits of my present invention, and without departing from the spirit thereof.

Having thus described my invention, I claim—

1. In combination with the tube of a commode, a continuous roll of tearable or easily-cut sealing material adapted to be fed below the seat across the opening through the tube, and a vibrating knife below the seat adjacent to the tube connected with the walls of the commode by vibrating mechanism, whereby at each use of the commode the knife is vibrated and a portion of the sealing material cut away, substantially as specified.

2. In combination with the tube of a commode, a continuous roll of tearable or easily-cut sealing material passing below the seat from side to side over the opening through the tube, and a vibrating knife supported below the seat adjacent to the tube by the walls of the commode and connected by the vibrating mechanism with the seat, whereby the knife is vibrated and a portion of the sealing material cut away at each use of the commode, substantially as specified.

3. In combination with the tube of a commode, a continuous roll of tearable or easily-cut sealing material passing below the seat from side to side across the opening through the tube to a roll upon the opposite side, and a vibrating circular knife supported below the seat adjacent to the tube by the walls of the commode and connected by the vibrating mechanism with the seat, whereby the knife is vibrated and a portion of the sealing material cut away at each use of the commode, substantially as specified.

4. In combination with the tube of a commode, a continuous roll of tearable or easily-cut sealing material passing from one side across the opening through the tube to a roll on the opposite side, a feed-ratchet connected to the roll, a pawl operated by the depression of the seat engaging the ratchet, and a knife for severing a portion of the seal at each use of the commode, substantially as specified.

5. In combination with the tube of a commode, a continuous roll of tearable or easily-cut sealing material passing from a roll on one side across the opening through the tube to a roll on the opposite side, a ratchet connected with the roll, a pawl connected with a pinion engaging the ratchet, a gear engaging the pinion connected with a rocker-shaft bearing knives, and a bolt connected with the rocker-shaft, substantially as specified.

6. In a commode, the combination with the tube or chamber and with a roll of sheet material, of a support adjacent to said tube for said roll and adapted to feed said material below the seat across the tube-opening, and a knife supported below the seat adjacent to the tube and connected with the walls of the commode by knife-actuating mechanism, whereby at each use of the commode the knife is actuated and a portion of the sheet cut away.

7. In a commode, the combination with the tube or chamber and with a roll of sheet material, of supply-apparatus for presenting and passing said material below the seat from side to side over the opening through the tube, means for operating said supply-apparatus, and a knife operatively supported adjacent to the tube and connected by the knife-actuating mechanism with the seat or cover, whereby the knife is actuated and a portion of the sheet cut away at each use of the commode, substantially as described.

8. In a commode, the combination with the tube of the commode, of a roll of sealing material extending below the seat from one side across the opening through the tube to a roll upon the opposite side, and a circular knife operatively supported adjacent to the tube, and knife-actuating mechanism connecting the knife with the vertically movable member above the seat, whereby the knife is operated and a portion of the sealing material cut away at each use of the commode, substantially as specified.

9. In a commode, the combination with the tube of the commode and with the vertically-movable member, of a sheet of sealing material passing from one side of and under the tube-opening, a roll for carrying said sheet, a roll-feed apparatus connecting the roll with the vertically movable member, and means for severing a portion of the sheet at each use of the commode, substantially as specified.

10. In a commode, the combination with the tube of the commode, of a roll for carrying and feeding a sheet of sealing material, a vertically movable member above the tube, such as a swinging seat or cover, connections from said vertically movable member to said roll, a shaft adjacent to said tube, a knife on said shaft, and means for operating said shaft.

11. In a commode, the combination with the tube or chamber and a movable seat or cover therefor, of a sheet-supply apparatus adapted and in position for successively presenting the sheets underneath the tube or chamber, and actuating devices substantially as described connecting said seat or cover with said apparatus for actuating the latter, substantially as described.

12. In a commode, the combination with the tube or chamber, of a seal-sheet supply-apparatus for presenting the seal-sheet under said tube or chamber, and a vertically movable seal-sheet support, substantially as described.

13. In a commode, the combination with the tube or chamber, of a seal-sheet supply-apparatus for presenting the seal-sheet under said tube or chamber, and a combined seal-sheet-support and knife.

14. In a commode, the combination with the chamber, and with a movable member operable by the user, of a sheet-supply apparatus in position for feeding the sheet to the chamber, a knife for cutting the fed-out portion of the sheet, and connections from said movable member to said supply apparatus and to said knife, whereby said apparatus and knife are both actuated, substantially as described.

15. In a commode, the combination with the chamber, and with a movable member operable by the user, of a sheet-supply apparatus in position for feeding the sheet to the chamber, a movable support for the fed-out portion of the sheet, and connections from said movable member to said supply-apparatus and to the sheet support, whereby said apparatus and the support are both actuated, substantially as described.

DANIEL H. MURPHY.

Witnesses:
FRANCIS H. RICHARDS,
EMMA G. FOWLER.